(12) United States Patent
Borkholder (10) Patent No.: US 11,370,256 B2
(45) Date of Patent: Jun. 28, 2022

(54) HITCH TIGHTENER

(71) Applicant: Gen-Y Creations, LLC, Nappanee, IN (US)

(72) Inventor: Carl J. Borkholder, Bremen, IN (US)

( * ) Notice: Subject to any disclaimer, the term of this patent is extended or adjusted under 35 U.S.C. 154(b) by 344 days.

(21) Appl. No.: 16/816,636

(22) Filed: Mar. 12, 2020

(65) Prior Publication Data
US 2021/0283962 A1    Sep. 16, 2021

(51) Int. Cl.
*B60D 1/28* (2006.01)
*B60D 1/52* (2006.01)
*B60D 1/145* (2006.01)

(52) U.S. Cl.
CPC .............. *B60D 1/28* (2013.01); *B60D 1/145* (2013.01); *B60D 1/52* (2013.01)

(58) Field of Classification Search
CPC .......... B60D 1/145; B60D 1/241; B60D 1/28; B60D 1/52; B60D 1/60; E05B 73/00; E05B 17/142
See application file for complete search history.

(56) References Cited

U.S. PATENT DOCUMENTS

| | | | | |
|---|---|---|---|---|
| 4,190,377 A | * | 2/1980 | Pleuss | F16B 7/105 403/108 |
| 5,580,076 A | * | 12/1996 | DeRoule | B60D 1/62 280/491.5 |
| 5,615,904 A | * | 4/1997 | Van Dusen | B60D 1/52 280/491.5 |
| 6,334,561 B1 | * | 1/2002 | Cole | B60R 9/06 280/506 |
| 6,672,115 B2 | * | 1/2004 | Wyers | B60D 1/52 70/381 |
| 6,733,029 B2 | * | 5/2004 | McCoy | B60D 1/52 403/109.5 |
| 6,773,200 B2 | * | 8/2004 | Cole | B60R 9/06 403/376 |
| 6,931,904 B2 | * | 8/2005 | Jones | B21K 21/12 72/359 |
| 7,338,065 B1 | * | 3/2008 | Clausen | B60D 1/241 280/505 |
| 7,412,864 B2 | * | 8/2008 | Jones | B60D 1/52 72/359 |
| 7,600,774 B1 | * | 10/2009 | Speer | B60D 1/58 403/387 |
| 7,806,425 B2 | * | 10/2010 | Chang | B60D 1/52 280/506 |

(Continued)

*Primary Examiner* — Kevin Hurley
*Assistant Examiner* — Maurice L Williams (57) ABSTRACT

A hitch tightening pin system is designed to attach a draw bar to a hitch receiver tube and prevent relative motion between the draw bar and receiver tube. The pin system has an elongate tapered shoulder bolt that has a larger and smaller outer diameter with a tapered surface extending between the larger and smaller outer diameter. The system includes an expansion sleeve that has arcuate portions. The expansion sleeve can slide onto the smaller outer diameter with the arcuate portions facing the tapered surface. A nut tightens to move the arcuate portions radially outwardly to apply force to the inside surface of a draw bar. The application of force causes the draw bar to be held tightly to the receiver tube and reduce or eliminate looseness or rattling during use.

17 Claims, 6 Drawing Sheets

(56) References Cited

U.S. PATENT DOCUMENTS

| | | | |
|---|---|---|---|
| 8,079,613 B2* | 12/2011 | Williams | B60D 1/241 |
| | | | 280/491.5 |
| 9,073,396 B2* | 7/2015 | Laurer | B60D 1/241 |
| 9,242,521 B2* | 1/2016 | Columbia | B60D 1/52 |
| 9,616,723 B2* | 4/2017 | Okerlund | B60D 1/60 |
| 9,663,040 B1* | 5/2017 | Shen | B60R 9/10 |
| 10,780,751 B2* | 9/2020 | Sartin | B60D 1/58 |
| 2002/0073746 A1* | 6/2002 | Wyers | B60D 1/60 |
| | | | 70/34 |
| 2002/0104338 A1* | 8/2002 | Koy | E05B 67/365 |
| | | | 70/386 |
| 2002/0145270 A1* | 10/2002 | Williams | B60D 1/241 |
| | | | 280/506 |
| 2004/0104558 A1* | 6/2004 | Williams | B60D 1/06 |
| | | | 280/491.5 |
| 2007/0261459 A1* | 11/2007 | Jones | B21K 21/12 |
| | | | 72/260 |
| 2011/0036129 A1* | 2/2011 | Frantz | B60D 1/52 |
| | | | 70/57 |
| 2013/0019641 A1* | 1/2013 | Burmesch | B60D 1/025 |
| | | | 70/31 |
| 2015/0210132 A1* | 7/2015 | Christensen | B60D 1/52 |
| | | | 280/491.5 |
| 2015/0343866 A1* | 12/2015 | Williams | B60D 1/241 |
| | | | 29/525.04 |
| 2016/0229241 A1* | 8/2016 | Su | B60D 1/60 |
| 2020/0346503 A1* | 11/2020 | Pedersoli | B60D 1/065 |
| 2021/0016619 A1* | 1/2021 | Columbia | B60D 1/60 |

\* cited by examiner

HITCH TIGHTENER

BACKGROUND OF THE INVENTION

This present disclosure relates to hitch receivers and towing accessories that are affixed to those receivers. Towing a camper, trailer, or connecting an accessory device behind a vehicle requires a hitch receiver of some sort, usually affixed to the rear of the vehicle below the bumper. Commonly, these are in the form of a receiver or square tube that is structurally affixed to the vehicle chassis. The receiver tube has a transverse hole that receives a locking pin. When the user desires to tow or connect an accessory of some sort to the receiver, the accessory is slid into the receiver tube until a transverse hole on the accessory aligns with the transverse hole on the receiver tube. The locking pin is installed to prevent the accessory from being removed from the receiver tube. Even with the locking pin in place, the accessory is a loose slip-fit to the receiver tube, so some relative motion is possible between the accessory and the receiver tube. This can be undesirable to the user, because the relative motion adds extra noise and movement when the vehicle or trailer moves over bumps.

Others have attempted to solve this problem, such as U.S. Pat. Nos. 6,733,029, 6,142,502, 6,105,989, 6,409,203, and 9,242,521. However, these attempts require additional components, are difficult to install, or are limited to specific hitch designs. An improved hitch tightener is needed.

SUMMARY OF THE INVENTION

The present disclosure describes an anti-rattle hitch pin that installs and is used in place of a standard hitch pin and clip. The anti-rattle hitch pin uses a tapered shoulder bolt, an expansion sleeve, and nut. The tapered shoulder bolt has a shoulder portion, a necked portion, and a tapered portion between the necked and shoulder portions. A portion of the necked portion is threaded to receive the nut. The expansion sleeve is sized to slip fit over the necked portion and has arcuate portions that face the tapered portion. As the nut is tightened, the arcuate portions begin to spread radially outwardly as they contact the tapered portion. The arcuate portions spread out and begin to contact the inside diameter of the draw bar. This secures the draw bar to the hitch tube.

DESCRIPTION OF THE PREFERRED EMBODIMENT

Figure 1:
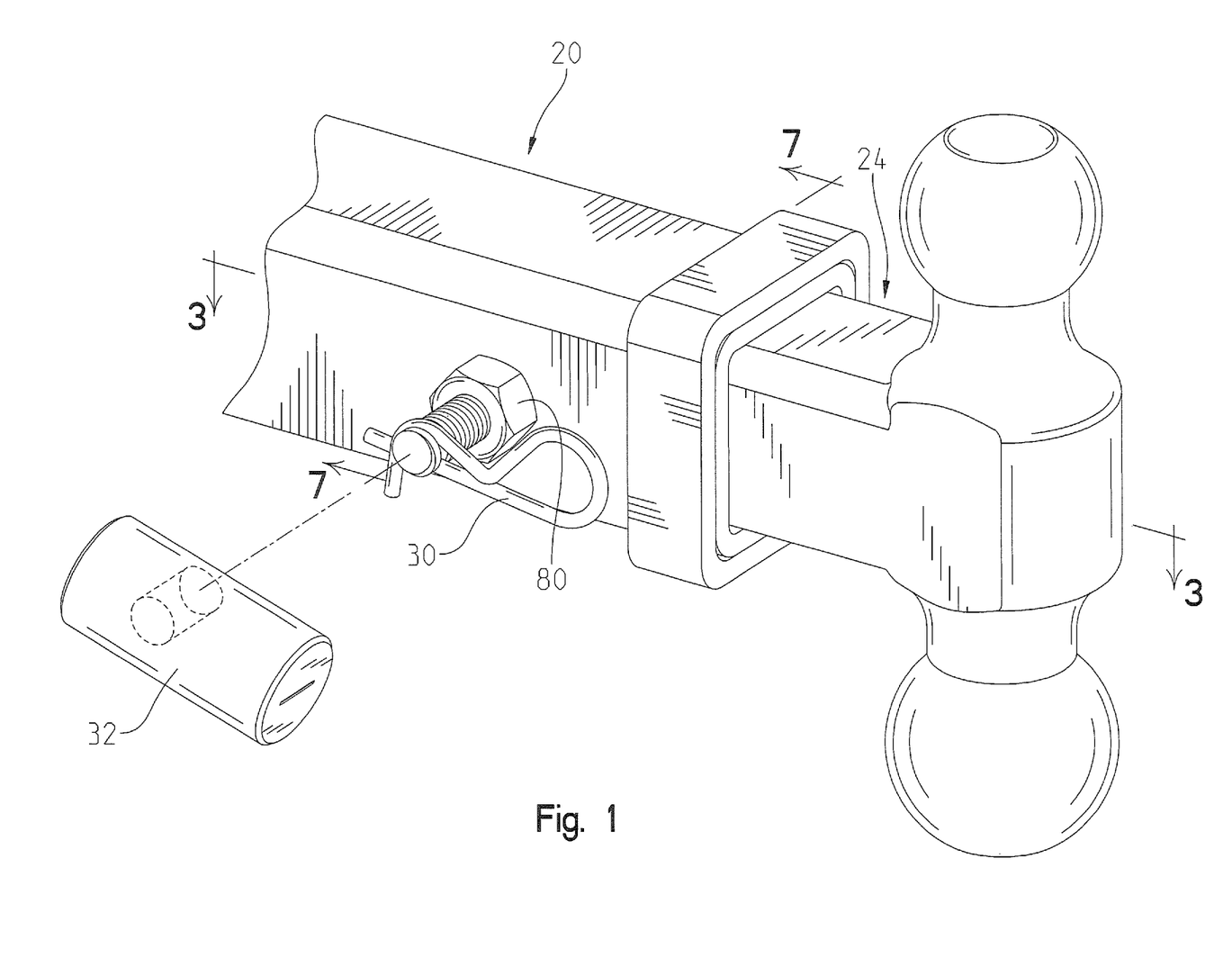
FIG. 1 is an isometric view of the hitch pin as installed.
Figure 3:
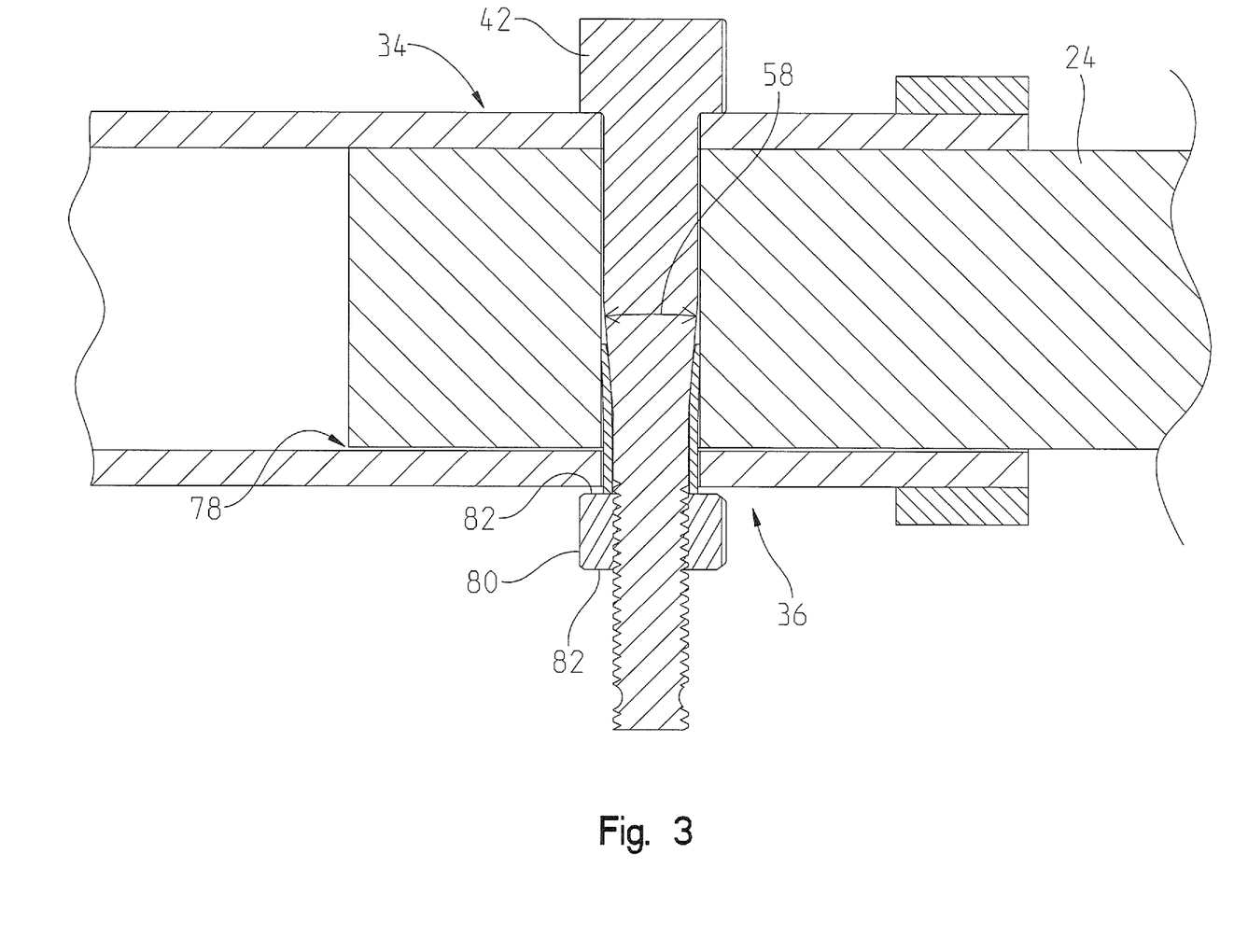
FIG. 3 is a top section view 3-3 of the assembly shown in FIG. 1.

An anti-rattle hitch pin 10 is shown in FIG. 1 as installed on a hitch receiver 20. The hitch receiver 20 is an elongate tube with a square cross-section and an opening 28 to receive a draw bar 24. The hitch receiver 20 is affixed to a towing vehicle (not shown) and the draw bar 24 is retained by the hitch receiver 20. The hitch receiver 20 has a transverse hole 22 for receiving the pin 10. The draw bar 24 fits inside the hitch receiver 20 and has a transverse hole 26 that aligns with the transverse hole 22. The hitch receiver 20 has a first side 34 and a second side 36 as shown in FIG. 3. The sides 34, 36 are not limiting. The identification of the sides 34, 36 are in relation to the components of the hitch pin 10.

Figure 2:
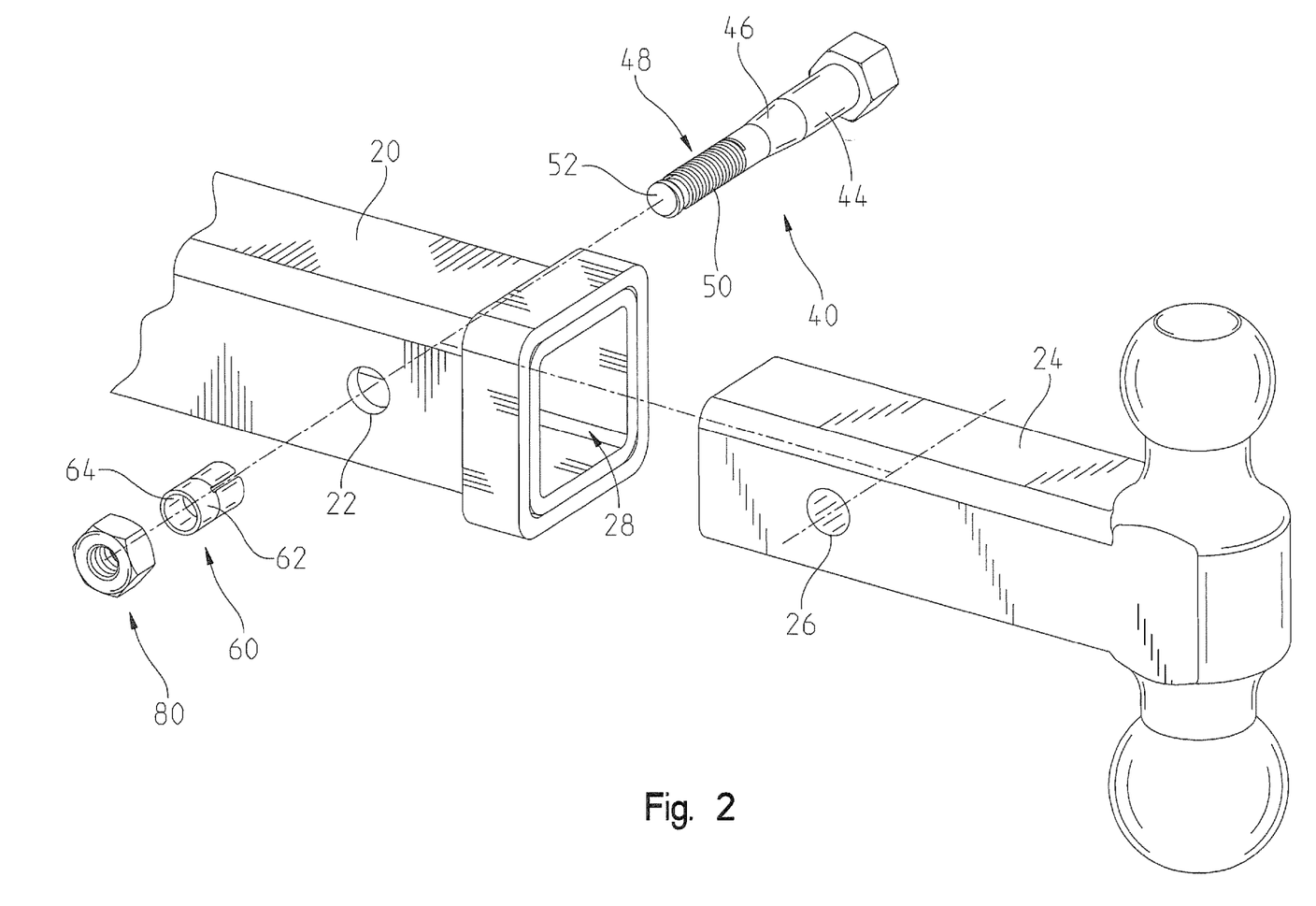
FIG. 2 is an exploded view of the hitch pin as shown in FIG. 1.

The hitch pin 10 has a tapered shoulder bolt 40, an expansion sleeve 60, and a threaded nut 80. The tapered shoulder bolt 40 has a head 42 that is shown in the FIGS. as hex head, but other shapes are possible. The bolt 40 has a shoulder portion 44 that extends from the head 42. The shoulder portion 44 has a diameter that closely matches the diameter of the transverse holes 22, 26. The close matching of the diameter of the shoulder portion 44 with the size of the transverse holes 22, 26 allows the tapered shoulder bolt 40 to be slid in with minimal effort without being excessively loose or require force to install or remove. The shoulder portion 44 is smooth and not threaded. A frusto-conical tapered portion 46 extends between the shoulder portion 44 and a necked portion 48. The necked portion 48 has a smaller diameter than the shoulder portion 44. The tapered portion 46 has an angle 58, around 10 degrees as shown. The angle can be greater or smaller, as much as 15 degrees or as small as 5 degrees. The shoulder portion 44 is partially threaded, as shown in FIGS. 2 and 3. The threads 50 start at a terminal end 52 and stop short of the shoulder portion 44. This leaves a short smooth area 54 on the necked portion 48. An undercut 56 is near the terminal end 52 to receive a cotter pin 30, clip, lock 32, or other device to secure the threaded nut 80.

Figure 4:
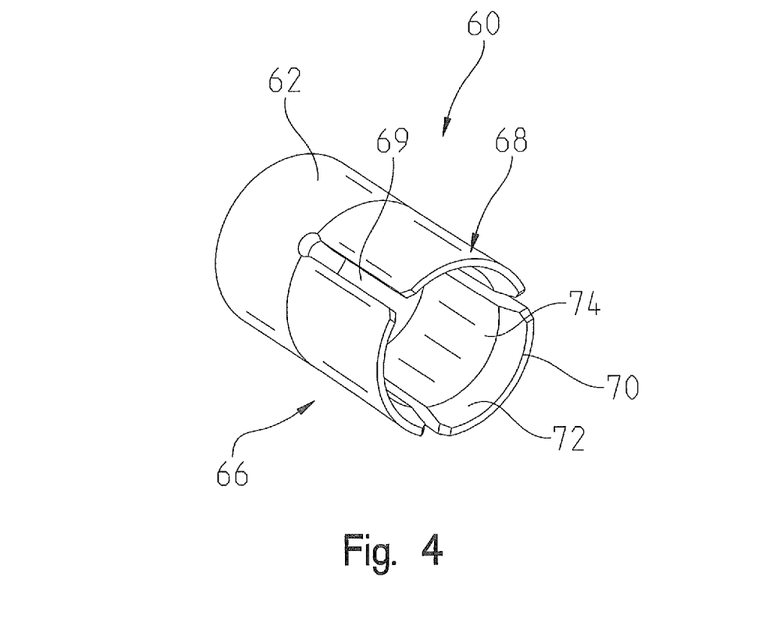
FIG. 4 is an isometric view of the expansion ring in FIG. 2.
Figure 5:
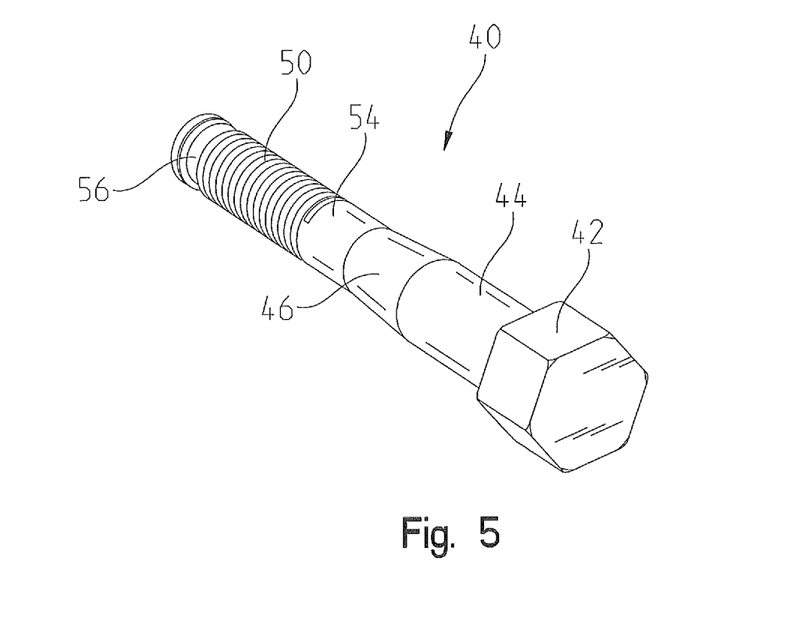
FIG. 5 is an isometric view of the tapered shoulder bolt in FIG. 2.
Figure 6:
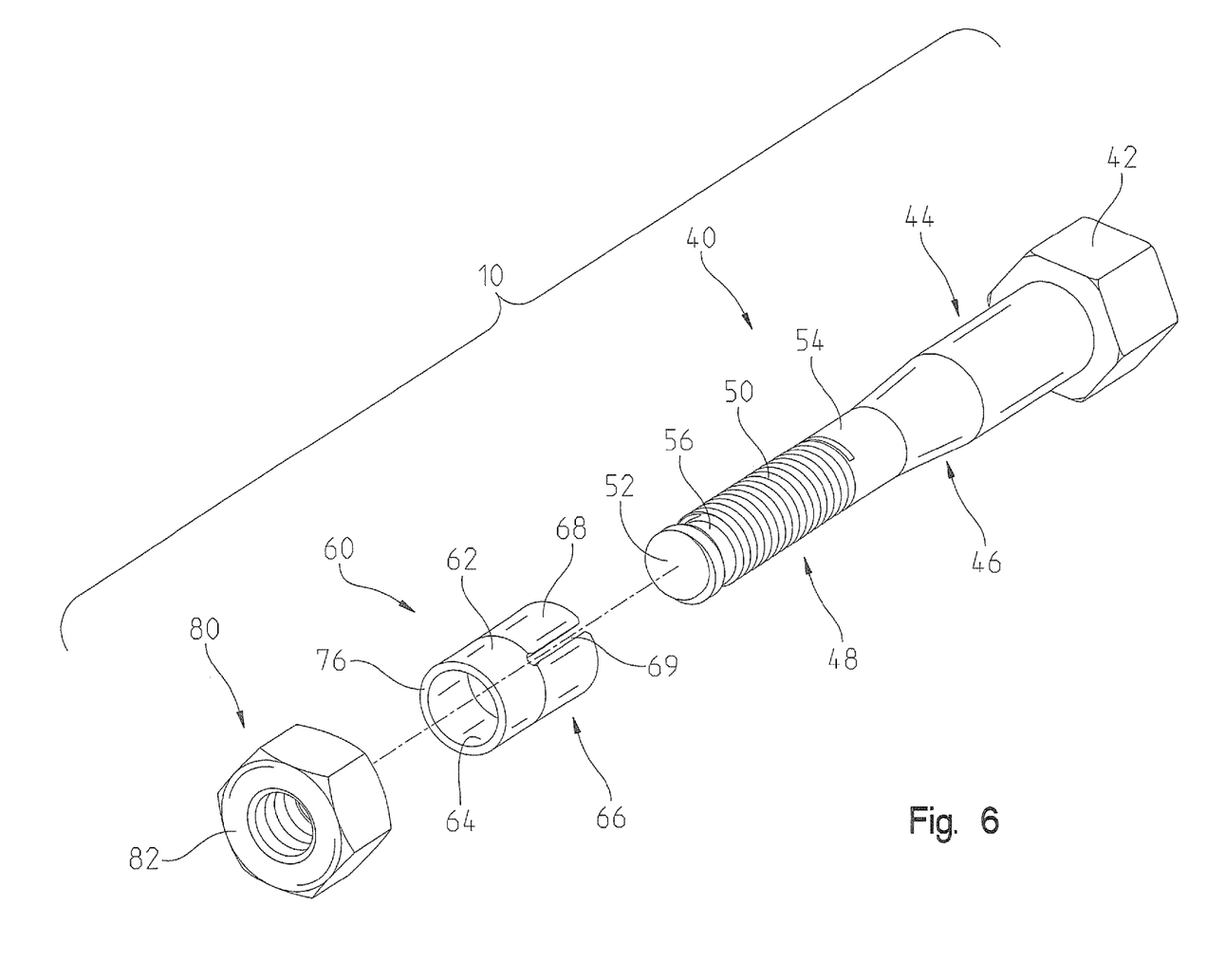
FIG. 6 is an exploded isometric view of the hitch pin.
Figure 7:
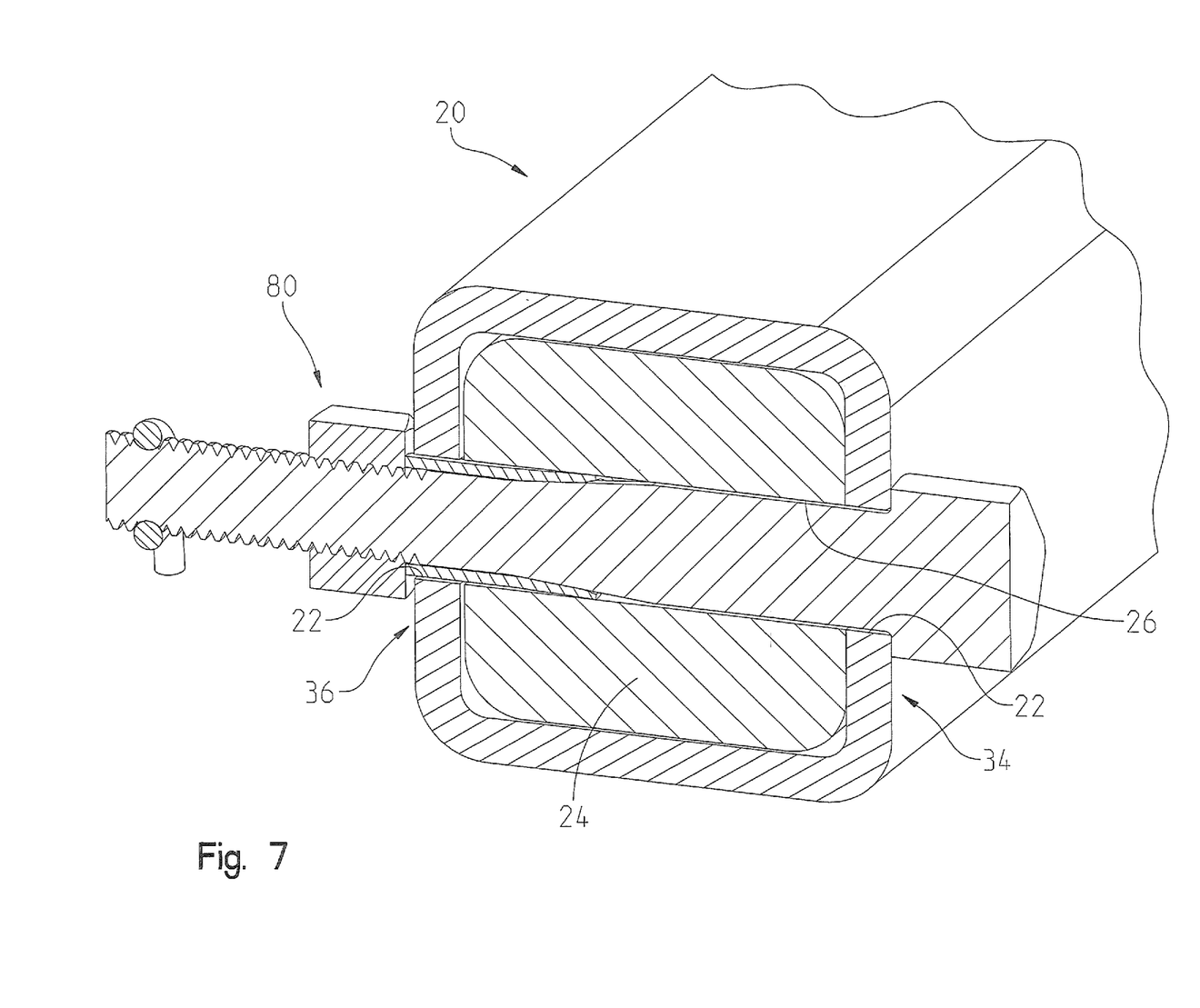
FIG. 7 is an isometric section view 7-7 of the assembly in FIG. 1.

The expansion sleeve 60 is designed to slide on to the necked portion 48. It has an outer diameter 62 that is smaller than the transverse holes 22, 26 and an inside diameter 64 that allows it to slide on the necked portion 48 of the bolt 40. The expansion sleeve 60 has an expanding portion 66 with arcuate sections 68. The arcuate sections 68 are shown as being equally spaced at 120 degrees with cuts 69 separating each section 68, but other spacing arrangements are contemplated. The arcuate sections 68 have a leading edge 70, a lead-in surface 72, and an effective inside diameter surface 74. The outwardly facing surfaces of the arcuate sections 68 form a constructive outside diameter. The arcuate sections 68 have a resting position, as shown in FIG. 4, and a displaced position defined by the lead-in surface 72 and/or effective inside diameter surfaces 74 in biased contact with the tapered portion 46 that displace the arcuate sections 68 outwardly. The slight angle of the tapered portion 46 facilitates sliding and displacing the arcuate sections 68 as the expansion sleeve is moved on the tapered portion 46 towards the shoulder portion 44. Opposite the leading edge 70 is a pressing surface 76 which is parallel to the leading edge 70. The nut 80 is threaded to mate with threads 50 and has flat surfaces 82 which are adapted to contact the pressing surface 76. This is shown in FIG. 3.

To install the hitch pin 10, the user first inserts a hitch accessory with a solid draw bar 24 into the hitch receiver 20 to align transverse holes 22, 26. Next, the tapered shoulder bolt 40 is inserted through the transverse holes 22, 26. The head 42 is located closest to the first side 34. Then, the user slides the expansion sleeve 60 onto the tapered shoulder bolt 40, with the leading edge 70 facing inwardly. The orientation of the expansion sleeve 60 is shown in FIG. 2. The expansion sleeve 60 is installed to be located closes to the second side 36. The user then installs the nut 80 and tightens it down against the expansion sleeve 60. As the nut 80 tightens and applies pressure to the expansion sleeve 60, the arcuate sections 68 begin to displace radially outwardly as the lead-in surface 72 and/or effective inside diameter surfaces 74 slide on the tapered portion 46. As the arcuate sections 68 spread outwardly from their resting position, they contact the inside surface of the transverse hole 26. In turn, this applies a biasing force to move the draw bar 24 into contact with the first side 34 of the hitch receiver 20. This is shown in FIG. 3. The draw bar 24 is urged inside the hitch receiver 20 towards the head 42, leaving a gap 78. In other words, as the nut 80 is tightened, the arcuate sections 68 on the expansion sleeve 60 spread out and grip the inside diameter of the transverse hole 26. As the expansion sleeve 60 grips the inside diameter of the transverse hole 26, the draw bar is moved over into contact with the first side 34 of the hitch receiver 20. A lock 32, cotter pin 30, or other device is attached to the terminal end 52 to prevent tampering and provide additional security.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A hitch tightener for use with a receiver tube having a transverse hole and a hitch accessory having a solid shank with a transverse hole, said tightener comprising:
    an elongate tapered shoulder bolt having a shank, said shank having a shoulder portion nearest a head and a necked portion nearest a terminal end opposite said head, said necked portion threaded from said terminal end, said shoulder portion connected to said necked portion by a frusto-conical tapered portion, said shoulder portion having an outer diameter smaller than said transverse holes in said receiver tube and said solid shank, said necked portion having a smaller diameter than said shoulder portion;
    an expansion sleeve having an outer diameter smaller than said transverse holes in said receiver tube and said solid shank, said expansion sleeve having an inside diameter for receiving said necked portion of said elongate bolt, said expansion sleeve having an expanding portion formed from a plurality of arcuate sections, said arcuate sections having a lead-in surface extending from a leading edge for contacting said frusto-conical tapered portion, said leading edge located on an end opposite from a pressing surface on said expansion sleeve, said arcuate sections movable between a resting position and a displaced position, said resting position defined by said shoulder portion having an effective outside diameter that matches said outer diameter of said expansion sleeve, said displaced position defined by said arcuate sections displaced radially outwardly from said resting position;
    a nut for threadably receiving said necked portion of said shank, said nut having a flat surface for contacting said pressing surface on said expansion sleeve; and
    when said nut is tightened against said expansion sleeve, said arcuate sections are displaced radially outwardly from said resting position by said frusto-conical tapered portion.

2. The hitch tightener of claim 1, wherein said tapered shoulder bolt has an undercut adjacent said terminal end, said undercut for receiving a clip or lock.

3. The hitch tightener of claim 1, wherein said expansion sleeve transverses said one of said transverse holes in said receiver tube and extends partially into said transverse hole in said shank.

4. The hitch tightener of claim 1, wherein said expansion sleeve has three equally-spaced arcuate sections.

5. The hitch tightener of claim 1, wherein said necked portion is free of said threading nearest said frutso-conical tapered portion.

6. The hitch tightener of claim 1, wherein said tapered portion of said tapered shoulder bolt is between 5 and 15 degrees.

7. A hitch tightener for use with a receiver tube having a transverse hole and a hitch accessory having a solid shank with a transverse hole, said tightener comprising:
    an elongate tapered shoulder bolt having a shank, said shank having a shoulder portion nearest a head and a necked portion nearest a terminal end opposite said head; said shoulder portion connected to said necked portion by a frusto-conical tapered portion, said shoulder portion having an outer diameter for being received by said transverse holes in said receiver tube and said solid shank, said outer diameter larger than said necked portion;
    an expansion sleeve having an outer diameter for being received by said transverse holes in said receiver tube and said solid shank, said expansion sleeve having an inside diameter for receiving said necked portion of said elongate bolt, said expansion sleeve having an expanding portion formed from a plurality of arcuate sections, said arcuate sections having a lead-in surface extending from a leading edge for contacting said frusto-conical tapered portion, said leading edge located on an end opposite from a pressing surface, said arcuate sections movable between a resting position and a displaced position, said resting position defined by said shoulder portion having an effective outside diameter that matches said outer diameter of said expansion sleeve, said displaced position defined by said arcuate sections displaced radially outwardly from said resting position;
    a nut for threadably receiving said necked portion of said shank, said nut having a flat surface for contacting said expansion sleeve on said pressing surface; and
    when said nut is tightened against said expansion sleeve, said arcuate sections are displaced radially outwardly from said resting position by said frusto-conical tapered portion.

8. The hitch tightener of claim 7, wherein said tapered shoulder bolt has an undercut adjacent said terminal end, said undercut for receiving a clip or lock.

9. The hitch tightener of claim 7, wherein said expansion sleeve transverses said one of said transverse holes in said receiver tube and extends partially into said transverse hole in said shank.

10. The hitch tightener of claim 7, wherein said expansion sleeve has three arcuate sections.

11. The hitch tightener of claim 7, wherein said tapered portion of said tapered shoulder bolt is between 5 and 15 degrees.

12. A method of tightening a hitch accessory having a sold shank to a receiver, said solid shank having a transverse hole and said receiver having a transverse hole, said method comprising the steps of:

providing an elongate tapered shoulder bolt having a shoulder portion, a necked portion, and a tapered portion located therebetween, said necked portion having threads;

locating said hitch accessory in said receiver to align said transverse holes of said receiver and said solid shank;

sliding said elongate tapered shoulder bolt through said transverse holes of said receiver and said solid shank;

providing an expansion sleeve having an expanding portion formed from a plurality of arcuate sections;

locating said expansion sleeve on said necked portion with said arcuate sections facing said transverse holes; and providing a nut for mating with said threads; and threading said nut onto said threads and driving said arcuate sections into biased contact with said tapered portion and said transverse hole of said solid shank to tighten said shank against said receiver.

13. The method of claim 12, further comprising the step of biasing said hitch accessory against one side of said receiver.

14. The method of claim 12, wherein said tapered portion of said elongate tapered shoulder bolt is between 5 and 15 degrees.

15. The method of claim 12, wherein said nut is spaced from said receiver when fully tightened against said expansion sleeve.

16. The method of claim 12, wherein said expansion sleeve transverses said one of said transverse holes in said receiver tube and extends partially into said transverse hole in said shank.

17. The method of claim 12, wherein said expansion sleeve has three equally-spaced arcuate sections.

* * * * *